United States Patent [19]

O'Keefe

[11] 3,842,862

[45] Oct. 22, 1974

[54] DIGITALLY TUNEABLE FLUIDIC OSCILLATOR

[75] Inventor: Robert F. O'Keefe, Trumbull, Conn.

[73] Assignee: Automatic Switch Company, Florham Park, N.J.

[22] Filed: June 14, 1973

[21] Appl. No.: 370,122

[52] U.S. Cl........ 137/814, 137/624.14, 235/201 ME

[51] Int. Cl............................. F15c 3/04, F15c 4/00

[58] Field of Search...... 137/821, 815, 819, 624.14, 137/102; 235/201 ME, 201 PF

[56] References Cited

UNITED STATES PATENTS

| | | | |
|---|---|---|---|
| 2,760,511 | 8/1956 | Greeff | 137/624.14 X |
| 3,243,113 | 3/1966 | Welsh | 137/821 |

*Primary Examiner*—Alan Cohan

*Attorney, Agent, or Firm*—Breitenfeld & Levine

[57] ABSTRACT

An oscillator system includes a multivibrator; means responsive to the 0 and 1 output binary states of the multivibrator for charging and discharging, respectively, a volume chamber; and means responsive to the pressure in the chamber and to a pair of logic signals for periodically changing the output states of the multivibrator. The means responsive to the pressure include a plurality of isolators whose input ports are connected to the volume chamber, each of the isolators being biased with a different pressure to provide a binary signal which changes state when the pressure in the chamber rises above or drops below the applied bias. Logic circuits responsive to the logic signals apply drive signals to the input ports of the multivibrator which are related to the state changes of the isolator biased with the lowest pressure and another of the isolators, thereby cycling the state of the output port of the multivibrator. The bias difference between the isolators whose state changes are used to drive the multivibrator, and the charge and discharge rates of the chamber determine the rate at which the output states of the multivibrator change. Where four isolators are provided, three differently biased isolators can be combined, separately, with the isolator biased with the low pressure to provide state changes, and hence the system can provide three frequencies. The state of the logic signals determines which of the isolators will be used to provide state changes for driving the multivibrator and therefore the frequency of oscillation of the system.

12 Claims, 9 Drawing Figures

| INPUTS | | OUTPUTS | | | |
|---|---|---|---|---|---|
| 11 | 12 | 60 | 61 | 62 | 63 |
| 0 | 0 | 1 | 0 | 0 | 0 |
| 1 | 0 | 0 | 1 | 0 | 0 |
| 1 | 1 | 0 | 0 | 1 | 0 |
| 0 | 1 | 0 | 0 | 0 | 1 |
FIG. 2
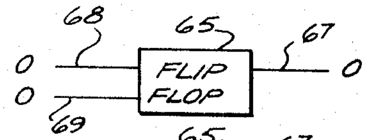
FIG. 3a
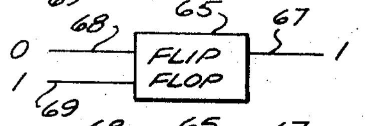
FIG. 3b
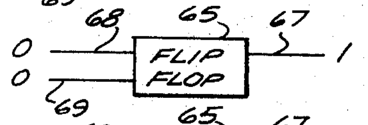
FIG. 3c
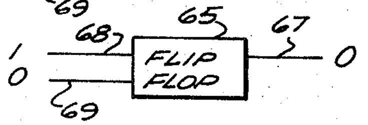
FIG. 3d
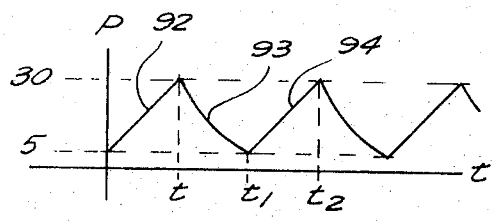
FIG. 4a
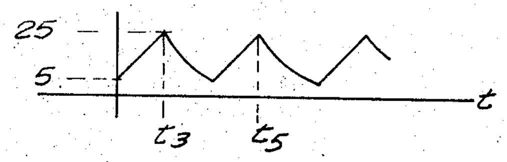
FIG. 4b
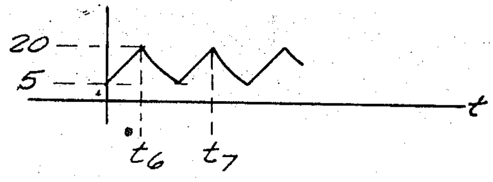
FIG. 4c

DIGITALLY TUNEABLE FLUIDIC OSCILLATOR

The subject invention relates to oscillators, and in particular to a fluidic oscillator whose operating frequency is related to fluidic binary signals applied to the oscillator.

One possible use for an oscillator according to the invention is in connection with dust collecting apparatus. Dust collecting apparatus utilizes filter bags upon which, with use, a dust buildup takes place. This dust buildup is usually removed by shaking the bags periodically by applying high pressure air pulses to them. Since the dust buildup is variable, the rate at which air pulses are applied to the filter bags should also be variable. The latter suggests the use of a variable frequency oscillator, responsive to the dust buildup rate, for modulating a high pressure source to provide high pressure air pulses at an appropriate frequency to the bags. It happens that the pressure differential between the interior and exterior of each filter bag is related to the dust buildup on the bag, i.e., the more dust, the greater the pressure differential. Moreover, devices for sensing variable pressure differentials and providing related fluidic logic signals are available.

Accordingly, it is an object of the present invention to provide a fluidic oscillator whose frequency of oscillation is responsive to fluidic logic signals.

In summary, the subject invention provides a system responsive to fluidic logic signals for providing a periodic fluidic signal, comprising: a fluidic bistable multivibrator having two input ports and an output port; means responsive to the logic signals for providing fluidic control signals; and means, coupling the output port to the input ports, responsive to the control signals for sensing the binary states of the output port and applying fluidic signals to the input ports to change the sensed state. A response time, related to the logic signals, elapses between the sensing and changing of the sensed state, and the time which elapses between successively initiated similar states determines the frequency of a periodic fluidic signal generated at the output port.

The foregoing and other objects and features of the invention are incorporated in an embodiment of the invention to be described below with reference to the accompanying drawings, in which:

FIG. 2 is a logic table relating input logic to the oscillator to logic states of connecting lines of the oscillator;

Figure 1:
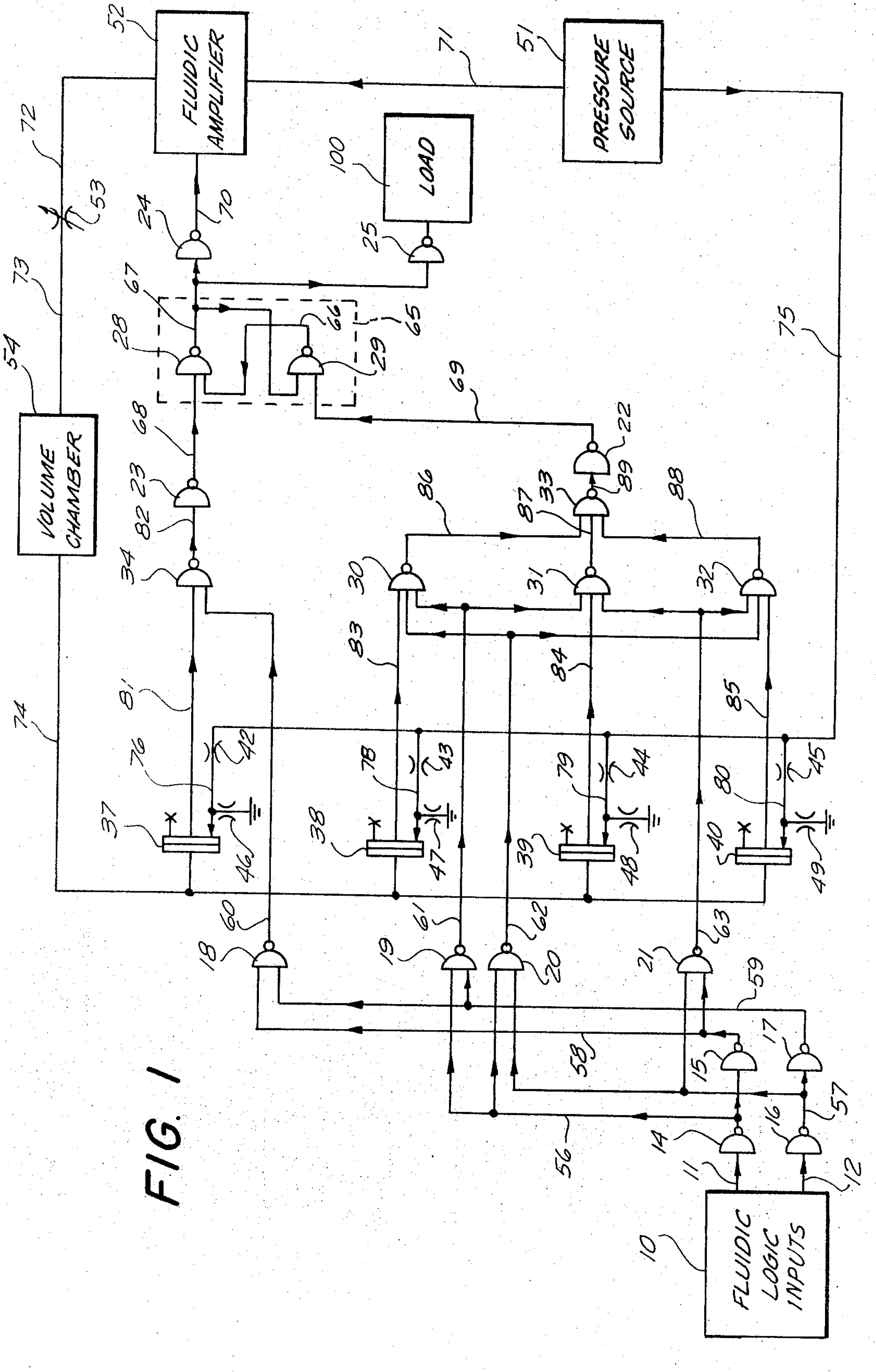
FIG. 1 is a schematic diagram of a fluidic oscillator, according to the invention, connected between a logic supply and a load.

FIGS. 3*a*–3*d* sequentially show the logic states of a multivibrator of the oscillator; and FIGS. 4*a*–4*c* show waveforms on a connecting line of the oscillator for each of three oscillator frequencies.

FIG. 1 shows a schematic diagram of a fluidic oscillator, according to the invention, connected to a fluidic logic input 10. The input 10 could, for example, be an analog-to-digital fluidic sensor such as is described in a patent application entitled "Analog-to-Digital Fluidic Sensor," Ser. No. 370,104, filed by me simultaneously with this application, or any other device capable of providing, in fluidic form, binary 0s and 1s on each of lines 11 and 12. In general, the oscillator includes fluidic inverters 14–17 and 22–25; fluidic NOR gates 18–21 and 28–34; fluidic isolators 37–40; restrictors 42–49 arranged in pairs to provide pressure dividers; a pressure source 51; a fluidic amplifier 52; a variable restrictor, e.g., a needle valve 53; and a volume chamber 54. The inverters and NOR gates may be provided in a variety of forms. Package structures are available which include a plurality of NOR logic elements and inverters. Such structures are shown in U.S. Pat. Nos. 3,512,558 and 3,495,608. The other components of the system are also commercially available. Isolators 34–40 are illustrated and described in U.S. Pat. application No. 737,870, filed June 18, 1968 (now abandoned) and are sold by Automatic Switch Company of Florham Park, New Jersey under Catalog No. 6,080,040. A suitable fluidic amplifier 52 is shown in U.S. Pat. No. 3,507,295.

Referring to FIG. 1 the oscillator includes a circuit, responsive to logic signals from the logic input 10, for providing signals which control the oscillator's frequency of oscillation. More specifically, line 11 is connected to the input port of inverter 14, and the output port of inverter 14 is connected to the input port of inverter 15 and by a line 56 to an input port on each of the NOR gates 19 and 20. Line 12 is connected to the input port of inverter 16, and the output port of inverter 16 is connected by a line 57 to the input port of inverter 17 and to an input port on each of the NOR gates 20 and 21. The output port of inverter 15 is connected by a line 58 to an input port on each of the NOR gates 18 and 21 and the output port of inverter 17 is connected by a line 59 to an input port on each of the NOR gates 18 and 19.

The output ports of NOR gates 18–21 are, respectively, connected to lines 60–63. In the circuit described, the binary state on each of the lines 60–63 is related to the binary states on lines 11 and 12. For example, if binary 0s exist on lines 11 and 12, binary 0s are applied to both input ports of NOR gate 18 and a binary 1 is provided on line 60. As is known, a NOR gate produces a binary 1 output when all its inputs receive binary 0 signals. If a binary 1 is applied to any input of the NOR gate, its output is a binary 0. Furthermore, since an inverter produces a binary output opposite that of its binary input, if binary 0s exist on lines 11 and 12, each of the NOR gates 19–21 receives at least one binary 1 and therefore these gates provide binary 0s on lines 61–63, respectively. In another example, if a binary 1 is applied to line 11 and a binary 0 is applied to line 12, binary 0s are connected to both input ports of NOR gate 19 and a binary 1 is provided on line 61. Furthermore, each of the NOR gates 18, 20, 21 receives at least one binary 1 and therefore these gates provide binary 0s on lines 60, 62, 63, respectively. Since four different combinations of 0s and 1s can be applied to lines 11 and 12, four different sets of output responses, two of which were described above, can be provided on lines 60–63. For convenience and further reference, these responses are shown in table form in FIG. 2. As more fully discussed below, each set of output responses determines a frequency of oscillation of the oscillator.

The oscillator includes a fluidic bistable multivibrator 65 composed of NOR gates 28 and 29, a line 66 connecting the output port of NOR gate 29 to an input port of NOR gate 28, and a line 67 connecting the output port of NOR gate 28 to an input port of NOR gate 29. Input binary signals to the multivibrator are provided over lines 68 and 69 connected, respectively, to input ports of NOR gates 28 and 29. The output binary signal of the multivibrator is provided on line 67. Operatively, when binary 0s are present on lines 68 and 69 a binary 0 is present on line 67 (see FIG. 3*a*). If, subsequently, the binary 0 on line 69 is changed to a binary 1, the binary 0 on line 67 changes to a binary 1 (see FIG. 3*b*). Thereafter, a change back on line 69 to binary 0 leaves the binary 1 on line 67 unaffected (see FIG. 3*c*). With binary 0s on lines 68 and 69 and a binary 1 on line 67, a binary change to 1 on line 68 drives line 67 to a binary 0 (see FIG. 3*d*). As more fully described below, the rate at which the sequence described above takes place determines the frequency of the oscillator.

The remainder of the oscillator circuit is connected as follows. Line 67 is connected to the input port of an inverter 24 whose output port is connected by line 70 to the control port of fluidic amplifier 52. The input port of the amplifier is connected by a line 71 to the pressure source 51 which in this example supplies to the amplifier fluid at a pressure of 40 inches of water. The output port of the amplifier is connected via line 72 to one port of the needle valve restrictor 53, and the other port of the needle valve is connected by line 73 to a volume chamber 54. Volume chamber 54 is connected by line 74 to each of the signal pressure ports of isolators 37–40. Pressure source 51 is connected by line 75 to one port of each of restrictors 42–45. The other port of each of the restrictors 42–45 is connected, by lines 76, 78, 79, and 80, respectively, to restrictors 46–49 which are vented to atmosphere. One of the outlet tubes of each of the isolators 37–40 is sealed and the other outlet tubes of the isolators 37–40 are connected, respectively, to lines 76–80. Restrictors 42–49 are selected to apply, via lines 76–80, a different pressure to each isolator. Thus, in this example, pressures of 5, 20, 25, and 30 inches of water are applied, respectively, to the inlet tubes of the isolators 37–40. When the pressure in line 74, which is applied to the signal pressure port of each isolator, exceeds the pressure applied to the inlet tube of the isolator via its respective pair of restrictors, no flow is permitted from the inlet tube to the outlet port of the isolator. However, when the pressure at the inlet port exceeds the pressure at the signal port (i.e., the pressure in line 74), flow from the inlet port to the outlet port of the isolator takes place.

The outlet port of isolator 37 is connected to line 81 and lines 81 and 60 are separately connected to a pair of input ports of NOR gate 34. The output port of NOR gate 34 is connected by a line 82 to the input port of an inverter 23 whose output port is connected to line 68. The output port of isolator 38 is connected via line 83 to an input port of NOR gate 30. Lines 61 and 62 are also connected to input ports of NOR gate 30. The output port of isolator 39 is connected by a line 84 to an input port of NOR gate 31. Lines 61 and 63 are also connected to input ports of NOR gate 31. The output port of isolator 40 is connected by a line 85 to an input of NOR gate 32. Lines 62 and 63 are also connected to input ports of NOR gate 31. The output ports of NOR gates 30–32 are connected by lines 86–88, respectively, to separate input ports of a NOR gate 33. The output port of NOR gate 33 is connected, by a line 89, to the input port of an inverter 22 whose output port is connected to line 69.

If, for example, a binary 1 is applied to line 11 and a binary 0 is applied to line 12 by logic input 10, the resulting binary 1 on line 61 (see FIG. 2) causes the inputs to NOR gate 33, along lines 86 and 87, to remain at a binary 0 state and the binary 0 on line 60 is applied to the NOR gate 34. Under these circumstances, if it is assumed that lines 67–69 of the multivibrator 65 are at binary 0 levels, (see FIG. 3*a*), the circuit functions as follows: The binary 0 on line 67 causes, via inverter 24, a binary 1 to appear at the control port of amplifier 52 and the pressure source 51 is thereby coupled to line 72. Fluid from the pressure source 51 passes through the variable restrictor 53 and into the volume chamber 54. As a result, the pressure in the volume chamber rises (see 92 in FIG. 4*a*) towards the 40 inch water pressure of the pressure source 51, at a rate which is dependent upon the volume of the chamber 54 and the constriction setting of the needle valve 53. If it is assumed that the pressure on line 74 is greater than 5 inches of water the output of isolator 37 (line 81) is at a binary 0 state and the 0 states on lines 81 and 60 provide, via inverter 23, the binary 0 on line 68, which was previously assumed. With the pressure on line 74 at less than 30 inches of water and rising a binary 1 is present on the output line 85 of isolator 40 and a binary 0 is present on line 88. Therefore, since all the inputs to NOR gate 33 are at a binary 0 level, inverter 22 applies the previously assumed binary 0 to line 69. Thus, for pressure increasing from 5 to 30 inches of water, on line 74, the assumed multivibrator states are confirmed. When the rising fluid pressure on line 74 reaches 30 inches, for example, at a time t (see FIG. 4*a*) the binary 1 on line 85 changes to a binary 0 and the binary 0 on line 69 changes to a binary 1. Therefore, the binary 0 on line 67 changes to a binary 1 (see FIG. 3*b*), the input to the control port of the amplifier 52 changes to binary 0, and the output port of the amplifier 52 is vented to atmosphere. In consequence, the pressure in the volume chamber 54 begins to drop (see 93 in FIG. 4*a*). As the pressure drops from 30 inches of water the binary state on line 85 changes from 0 to 1 and the binary state on line 69 changes from 1 to 0. However, this change does not affect the state of the line 67 of the multivibrator (see FIG. 3*c*) and the pressure in the volume chamber 74 continues to drop. When the pressure on line 74, for example, at a time $t_1$, drops slightly below 5 inches of water, the binary state on line 81 changes from 0 to 1 and, as a result, a binary 1 is applied to multivibrator 65 via line 68. The binary change, from 0 to 1, on line 68 drives the binary state on line 67 from 1 to 0 (see FIG. 3*d*) and, the amplifier again couples the pressure source 51 to line 72. Thus, the pressure at line 74 begins to rise again (see 94 in FIG. 4*a*). During its rise the pressure increases above 5 inches of water and when it does so the binary state of line 81 changes from 1 to 0 and the input to line 68 changes from 1 to 0 (see FIG. 3*a*). From the foregoing it may be seen that the circuit now has the same states as it had at the beginning of the described cycle, and therefore, the pressure in the volume chamber will rise to 30 inches of water, for example, at time $t_2$. Thus, with binary inputs 1 and 0 on lines 11 and 12, respectively, the circuit oscillates at a frequency $f$ equal to the reciprocal of the time $t_2$–$t$.

If binary 1s are applied to lines 11 and 12 (see FIG. 2) a binary 1 is applied via line 62 to NOR gates 30 and 32. The oscillator will function as described above except that isolators 38 and 40 will be inhibited and a change of state on line 84 will cause the multivibrator to change its state to that shown in 36 when the pressure on line 74 rises to 25, instead of 30 inches of water (see $t_3$ and $t_5$ in FIG. 4*b*). Since the rate at which the pressure on line 74 increases is constant, the rise and fall times, $t_5$—$t_3$, of the pressure on line 74 is reduced when binary 1s are applied to lines 11 and 12, and the resulting frequency $f_1$of the oscillator is greater than the frequency $f$ (see FIG. 4*b*).

Similarly, if a binary 0 is applied to line 11 and a binary 1 is applied to line 12, a binary 1 is applied via line 63 (see FIG. 2) to NOR gates 31 and 32. As a result, the oscillator will function as described above except that when the pressure on line 74 rises to 20 inches of water the state of the multivibrator 65 changes to that shown in FIG. 3*b* and the pressure begins to drop (see $t_6$ and $t_7$ in FIG. 4*c*). Thus, the rise and fall times, $t_7$—$t_6$, of the pressure on line 74 are less than that which was associated with (1,0), (1,1), inputs to lines 11 and 12 and the frequency $f_2$ of the oscillator for 0,1 inputs to lines 11 and 12, respectively, is greater than frequencies $f$ and $f_1$.

Referring to FIG. 1, line 67 is connected via an inverter 25 to a load 100. Thus, the load receives well defined pulses at a running frequency which is determined by logic signals applied to lines 11 and 12.

When binary 0s are applied to lines 11 and 12, line 60 applies a binary 1 to NOR gate 34. Thus, a constant binary 1 is applied to line 68 and line 74 changes to the pressure of the pressure source 51, i.e., 40 inches of water. In such event, a constant binary 1 is applied to load 100.

From the foregoing, it may be seen that the frequencies at which the oscillators can oscillate, with a fixed setting of the needle valve 53, are determined by the bias pressures applied to the isolators 38–40 via lines 78–80, respectively, and that a particular one of these frequencies is selected by inhibiting with logic circuits the output signals of two of the three isolators 38–40. Further, it may be noted that when a particular frequency has been selected, variations in the capacity of the volume chamber 54 and/or the constriction provided by needle valve 53 can be used to change and descharge rate of the volume chamber. Accordingly, such a change may be used to fine-tune the selected frequency.

In this example, four isolators 37–40 are furnished, and three different frequencies of oscillation are possible. Of course, a greater or fewer number of isolators may be provided to achieve a number of possible different frequencies of oscillation equal to one less than the number of isolators present.

It may be mentioned that for convenience of illustration, the usual fluid supply to the fluidic NOR gates of the oscillator has not been shown.

It is to be understood that the description herein of a preferred embodiment according to the invention is set forth as an example thereof and is not to be construed or interpreted as a limitation on the claims which follow and define the invention.

What is claimed is:

1. A system responsive to various fluidic logic signals for providing a periodic fluidic signal, comprising:

a. a fluidic bistable device having two input ports and an output port;

b. means responsive to the logic signals for providing fluidic control signals, said responsive means including at least a pair of inverters responsive to the logic signals, and a plurality of NOR gates coupled to the inverters for providing the control signals; and c. means, coupling the output port to the input ports, for sensing the binary states of the output port and applying fluid signals to the input ports to change the sensed state, thereby providing a periodic fluidic signal, said coupling means being responsive to said control signals for varying the rate at which fluid signals are applied to the inputs.

2. A system as defined in claim 1 wherein the bistable device includes first and second NOR gates, and means coupling the output port of the first NOR gate to an input port of the second NOR gate and the output port of the second NOR gate to an input port of the first NOR gate.

3. A system responsive to various fluidic logic signals for providing periodic fluidic signals, comprising:

a. a fluidic bistable device having two input ports and an output port;

b. means responsive to the logic signals for providing fluidic control signals; and c. means, coupling the output port to the input ports, responsive to the control signals for sensing the binary states of the outport port and applying fluid signals to the input ports to change the sensed state, thereby providing a periodic fluidic signal, said means for sensing and applying fluidic signals including a volume chamber; means responsive to the binary state of the output port for charging and discharging the volume chamber at predetermined rates; and means responsive to the pressure in the chamber and to the control signals for changing the state of the signals applied to the bistable device at predetermined times.

4. A system as defined in claim 3 wherein said means for charging and discharging the volume chamber includes a fluidic amplifier coupled to the output port of the bistable device, a fluid pressure source coupled to the fluidic amplifier, and a restrictor coupling the output port of the amplifier to the volume chamber.

5. A system as defined in claim 4 wherein the restrictor is variable, thereby providing variable charging and discharging rates.

6. A system as defined in claim 3 wherein said means responsive to the pressure in the volume chamber and to the control signals includes a plurality of isolators coupled to the volume chamber, means for biasing said plurality of isolators, and a fluidic logic circuit, responsive to the control signals, for coupling the isolators to the bistable device.

7. A system as defined in claim 6 wherein said means for biasing the isolators includes a fluid pressure source, a plurality of pressure dividers, each of the dividers coupling to a different one of the isolators fluid under a different pressure.

8. A system as defined in claim 7 wherein the logic circuit includes means coupling one of the control signals and one of the output signals of the inverter biased with the lowest pressure to one of the inputs of the bistable device; and means responsive to all but said one of the control signals for coupling a signal related to the output signal of one of the inverters biased with a pressure greater than said lowest pressure, whereby the frequency of the periodic fluidic signal is related to the difference in bias pressures applied to the inverters whose output signals are coupled to the inputs of the bistable device.

9. A system as defined in claim 8 wherein said means responsive to the logic signals includes at least a pair of inverters responsive to the logic signals, and a plurality of NOR gates coupled to the inverters for providing the control signals.

10. A fluidic oscillator responsive to various fluidic logic input signals for providing periodic fluidic signals, comprising:

a. a fluidic bistable device having input and output ports, b. means for applying fluidic logic signals to said bistable device, to change the binary state of the output from said device, c. means responsive to the binary state of the output from said bistable device for causing said applying means (b) to apply fluidic logic signals to said bistable device at a predetermined rate dependent upon the last fluidic logic input signal applied to the oscillator, and d. means responsive to different fluidic logic input signals for changing the predetermined rate at which said applying means (b) applies fluid logic signals to said bistable device and hence for changing the rate at which the output of said bistable device changes its binary state.

11. A fluidic oscillator as defined in claim 10 wherein said responsive means (c) includes a volume chamber which is connected to and disconnected from a source of pressurized fluid depending upon the binary state of the output from said bistable means, and said applying means (b) includes a plurality of isolator means each having an input communicating with said volume chamber and an output, and means biasing each of said isolator means at a different pressure so that the binary state of the output of each isolator means changes in response to a different pressure applied to its input.

12. A fluidic oscillator as defined in claim 11 wherein said responsive means (d) includes means responsive to different fluidic logic input signals for selectively inhibiting the effect on said bistable device of all but two of said isolator means at any one time.

* * * * *